United States Patent
An et al.

(10) Patent No.: US 12,431,591 B2
(45) Date of Patent: Sep. 30, 2025

(54) BATTERY MODULE HAVING BUSBAR, BATTERY PACK AND VEHICLE

(71) Applicant: LG Energy Solution, Ltd., Seoul (KR)

(72) Inventors: Ji-Myong An, Daejeon (KR); Ji-Soo Park, Daejeon (KR); Jae-Young Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 784 days.

(21) Appl. No.: 17/769,962

(22) PCT Filed: Feb. 25, 2021

(86) PCT No.: PCT/KR2021/002408
§ 371 (c)(1),
(2) Date: Apr. 18, 2022

(87) PCT Pub. No.: WO2021/182779
PCT Pub. Date: Sep. 16, 2021

(65) Prior Publication Data
US 2022/0376361 A1    Nov. 24, 2022

(30) Foreign Application Priority Data
Mar. 9, 2020    (KR) .......................... 10-2020-0029139

(51) Int. Cl.
*H01M 50/505* (2021.01)
*H01M 50/213* (2021.01)
*H01M 50/566* (2021.01)

(52) U.S. Cl.
CPC ....... *H01M 50/505* (2021.01); *H01M 50/213* (2021.01); *H01M 50/566* (2021.01); *H01M 2220/20* (2013.01)

(58) Field of Classification Search
CPC ............. H01M 50/505; H01M 50/213; H01M 50/566; H01M 2220/20; H01M 50/503; H01M 50/507; H01M 50/516; H01M 50/502; H01M 50/20; B23K 15/008; B23K 26/22; Y02E 60/10
See application file for complete search history.

(56) References Cited

U.S. PATENT DOCUMENTS

| | | | |
|---|---|---|---|
| 7,807,288 B2 | 10/2010 | Yoon et al. | |
| 2009/0068555 A1 | 3/2009 | Fukuoka et al. | |
| 2009/0104516 A1 | 4/2009 | Yoshihara et al. | |
| 2016/0315303 A1* | 10/2016 | Eberhard | B23K 15/008 |
| 2017/0179458 A1 | 6/2017 | Sato et al. | |
| 2018/0159098 A1 | 6/2018 | Ling et al. | |
| 2019/0148681 A1* | 5/2019 | Park | H01M 50/289 |
| | | | 429/120 |
| 2019/0245126 A1 | 8/2019 | Lim | |
| 2019/0305395 A1* | 10/2019 | Favaretto | H01M 10/6556 |
| 2019/0386353 A1* | 12/2019 | Jang | B23K 11/18 |
| 2020/0076022 A1 | 3/2020 | Kawakami et al. | |
| 2020/0280040 A1 | 9/2020 | Lee et al. | |
| 2020/0321590 A1* | 10/2020 | Park | H01M 10/0422 |
| 2021/0075071 A1* | 3/2021 | Lee | H01M 10/0422 |

FOREIGN PATENT DOCUMENTS

| | | |
|---|---|---|
| CN | 104380405 A | 2/2015 |
| CN | 108598352 A | 9/2018 |
| CN | 110459725 A | 11/2019 |
| JP | 2002-184371 A | 6/2002 |
| JP | 2006-294524 A | 10/2006 |
| JP | 2007-005288 A | 1/2007 |
| JP | 2009-187691 A | 8/2009 |
| JP | 2017-142923 A | 8/2017 |
| JP | 6326036 B2 | 5/2018 |
| JP | 2018-206738 A | 12/2018 |
| KR | 10-2019-0040565 A | 4/2019 |
| KR | 10-2019-0122407 A | 10/2019 |
| KR | 10-2019-0142581 A | 12/2019 |
| TW | I337414 B | 2/2011 |
| WO | 2018/221004 A1 | 12/2018 |

OTHER PUBLICATIONS

International Search Report (with partial English translation) and Written Opinion issued in corresponding International Patent Application No. PCT/KR2021/002408 dated Jun. 18, 2021.
Office Action issued in corresponding Japanese Patent Application No. 2022-518804 dated Jul. 10, 2023.
Office Action issued in corresponding Chinese Patent Application No. 202180006236.4, dated Aug. 8, 2023. (Note: US 2016/315303 A1, JP 2007-005288 A, JP 2006-294524 A, JP 2009-187691 A, KR 10-2019-0122407 A and WO 2018/221004 A1 have been previously cited).
Office Action issued in corresponding Taiwanese Patent Application No. 110105271, dated Aug. 1, 2024.

* cited by examiner

*Primary Examiner* — Muhammad S Siddiquee
(74) *Attorney, Agent, or Firm* — Morgan, Lewis & Bockius LLP (57) ABSTRACT

Disclosed is a battery module improved in efficiency of resistance welding and bonding reliability. The battery module includes a plurality of secondary batteries, each having electrode terminals; a module housing having an inner space configured to accommodate the plurality of secondary batteries; and a bus bar including a body portion having a metal plate configured to electrically connect the plurality of secondary batteries to each other and a connection portion extending from the body portion to contact the electrode terminal. Each of the first connection portion, the second connection portion, and the third connection portion has at least one welding point.

12 Claims, 6 Drawing Sheets

BATTERY MODULE HAVING BUSBAR, BATTERY PACK AND VEHICLE

TECHNICAL FIELD

The present disclosure relates to a battery module having a bus bar, a battery pack, and a vehicle, and more particularly, to a battery module improved in efficiency of resistance welding and bonding reliability.

The present application claims priority to Korean Patent Application No. 10-2020-0029139 filed on Mar. 9, 2020 in the Republic of Korea, the disclosures of which are incorporated herein by reference.

BACKGROUND ART

In recent years, the demand for portable electronic products such as notebooks, video cameras, mobile phones, or the like is rapidly increasing, and the development of electric vehicles, energy storage batteries, robots, satellites, or the like is in earnest. For this reason, high-performance secondary batteries enabling repeated charging and discharging are being actively researched.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery case, hermetically containing the electrode assembly together with an electrolyte.

In addition, the lithium secondary battery may be classified depending on the exterior shape into a can-type secondary battery in which an electrode assembly is included in a metal can and a pouch-type secondary battery in which an electrode assembly is included in a pouch made of an aluminum laminate sheet.

Here, in case of the can-type secondary battery, the metal can in which the electrode assembly is included is sometimes manufactured in a cylindrical shape. The can-type secondary battery may be used to configure a battery module having a housing for accommodating a plurality of secondary batteries and a bus bar for electrically connecting the plurality of secondary batteries.

Recently, the bus bar provided to the battery module may be set to have a plurality of bonding portions in order to increase bonding strength with an electrode terminal of the secondary battery. However, if the welding space for welding the bus bar and the electrode terminal is narrow, it is difficult to perform multiple welding.

In addition, even if the current applied from a welding rod has the same intensity during resistance welding, for the plurality of joints, if any one of current paths between the welding points has a relatively short or long length so that the current paths have different lengths, welding defects frequently occur due to relatively insufficient resistance heat or overcurrent at any one welding point, and thus it is difficult to perform welding with uniform quality.

Accordingly, there are problems that the manufacturing cost increases due to an increased defect rate, and the joints between the bus bar and the electrode terminals of the secondary battery are easily broken to deteriorate durability of the battery module.

DISCLOSURE

Technical Problem

The present disclosure is designed to solve the problems of the related art, and therefore the present disclosure is directed to providing a battery module improved in efficiency of resistance welding and bonding reliability.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:
 a plurality of secondary batteries, each having at least two electrode terminals formed therein;
 a module housing having an inner space formed to accommodate the plurality of secondary batteries; and
 a bus bar including a body portion having a metal plate configured to electrically connect the plurality of secondary batteries to each other and a connection portion extending from the body portion to contact the electrode terminal,
 wherein the connection portion includes a first connection portion formed to protrusively extend from an end of the body portion toward the electrode terminal; a second connection portion formed to protrusively extend from the end of the body portion toward the electrode terminal and located at one side of the first connection portion, the second connection portion having a part spaced apart from the first connection portion by a predetermined distance; and a third connection portion formed to protrusively extend from the end of the body portion toward the electrode terminal and located at the other side of the first connection portion, the third connection portion having a part spaced apart from the first connection portion by a predetermined distance,
 wherein each of the first connection portion, the second connection portion and the third connection portion has at least one welding point.

A length of an electric connection path between the welding point of the first connection portion and the welding point of the second connection portion may be identical to a length of an electric connection path between the welding point of the first connection portion and the welding point of the third connection portion.

Also, the module housing may have an opening perforated to expose the electrode terminal to the outside,
 the first connection portion may include a first extending part extending from the end of the body portion to the opening and bent toward the electrode terminal, and a first junction part extending from the first extending part to face the electrode terminal and having at least two welding points, the second connection portion may include a second extending part extending from the end of the body portion to the opening and bent toward the electrode terminal, and a second junction part extending from the second extending part to face the electrode terminal and having at least one welding point, and the third connection portion may include a third extending part extending from the end of the body portion to the opening and bent toward the electrode terminal, and a third junction part extending from the third extending part to face the electrode terminal and having at least one welding point.

Moreover, the first junction part of the first connection portion may horizontally extend in both directions from the first extending part and has welding points respectively formed at both extending ends of the first junction part, the welding point of the second junction part may be located to face the welding point formed at any one of both ends of the first junction part, and the welding point of the third junction part may be located to face the welding point formed at the other of both ends of the first junction part.

In addition, the second junction part of the second connection portion may be bent and extend along an outer circumference of any one of both ends of the first junction part of the first connection portion, and the third junction part of the third connection portion may be bent and extend along an outer circumference of the other of both ends of the first junction part of the first connection portion.

Further, the first junction part may have at least two grooves recessed toward an inside of the body portion, and an end of each of the second junction part and the third junction part may be bent in a horizontal direction to be inserted into each of the at least two grooves.

Also, the first junction part may extend in one direction from the first extending part, and the second junction part and the third junction part may be respectively bent in a horizontal direction to surround an outer circumference of the first junction part.

In addition, at least one of the second junction part and the third junction part may extend longer or shorter than the first junction part from the body portion in one direction.

Further, the bus bar may have at least one connection hole perforated in the body portion, and at least two of the first connection portion, the second connection portion and the third connection portion may protrusively extend in different directions from an inner rim of the connection.

Also, in another aspect of the present disclosure, there is also provided a battery pack, comprising the battery module according to the present disclosure.

Further, in another aspect of the present disclosure, there is also provided a vehicle, comprising the battery pack according to the present disclosure.

Advantageous Effects

According to an embodiment of the present disclosure, the connection portion of the bus bar includes a first connection portion protrusively extending from the end of the body portion toward the electrode terminal, a second connection portion protrusively extending from the end of the body portion toward the electrode terminal and located at one side of the first connection portion to have a part spaced apart from the first connection portion by a predetermined distance, and a third connection portion protrusively extending from the end of the body portion toward the electrode terminal and located at the other side of the first connection portion to have a part spaced apart from the first connection portion by a predetermined distance. Also, each of the first connection portion, the second connection portion and the third connection portion is at least one welding point. Therefore, when resistance welding is performed between the electrode terminal of the secondary battery and the connection portion of the bus bar, the resistance welding may be performed at two parts. Moreover, since the connection portion of the present disclosure is divided into three parts to simplify the shape, resistance welding may be easily performed even in a narrow space of the module housing where the electrode terminal is exposed.

According to an embodiment of the present disclosure, since the length of the electric connection path between the welding point of the first connection portion and the welding point of the second connection portion is identical to the length of the electric connection path between the welding point of the first connection portion and the welding point of the third connection, when resistance welding performed at the welding point, two or more welding parts may be welded using the same amount of current, so it is not needed to change the amount of current for welding every welding part. Therefore, the welding process becomes easy, and the welding quality of two or more welding sites may be uniform. Ultimately, the present disclosure may improve the efficiency of resistance welding and the bonding reliability.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
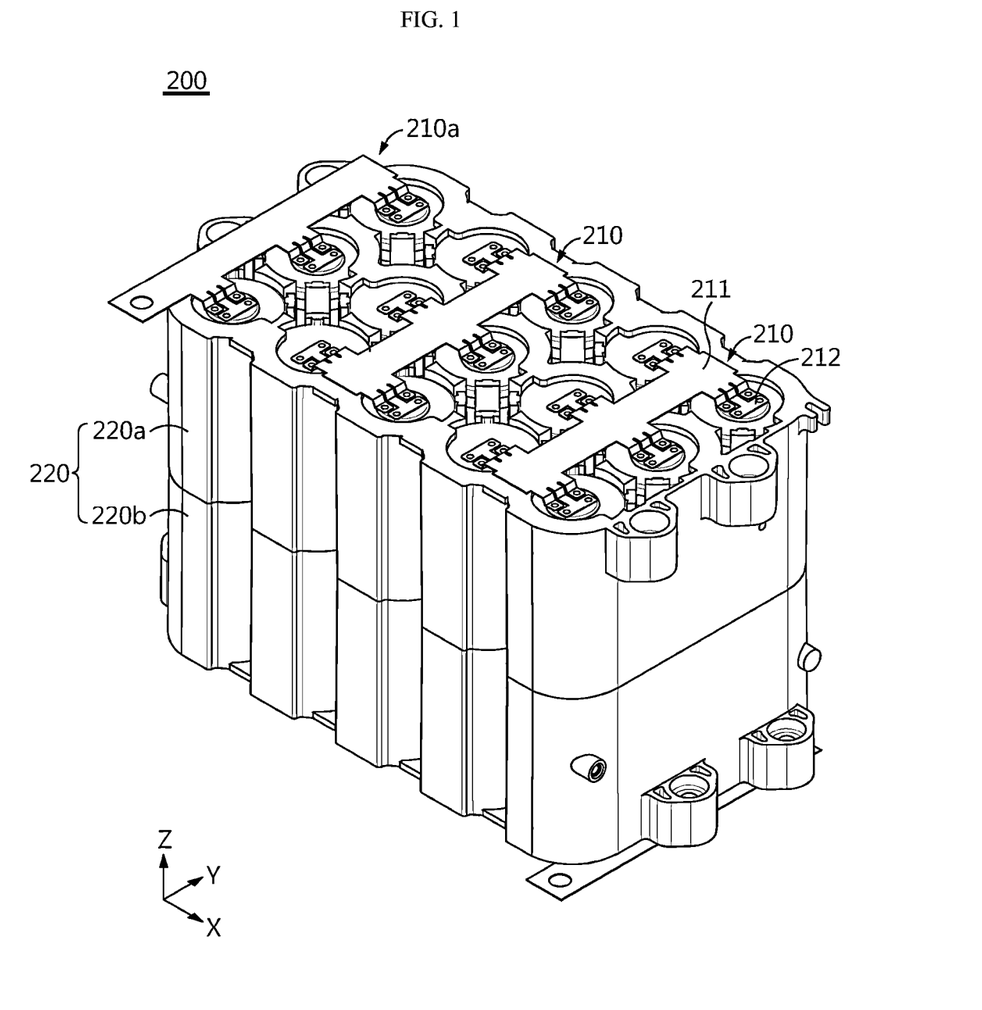
FIG. 1 is a perspective view schematically showing a battery module according to an embodiment of the present disclosure.
Figure 2:
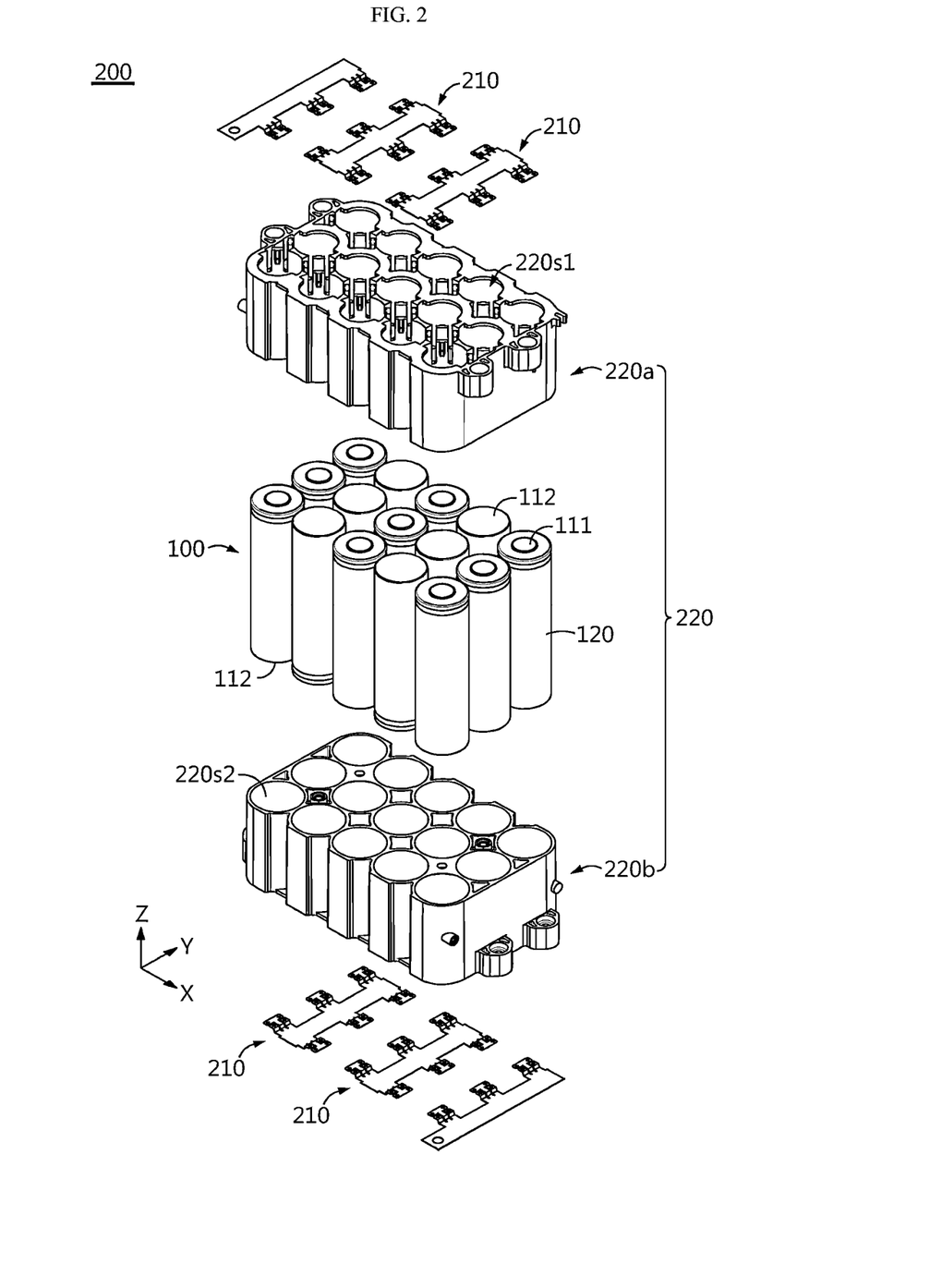
FIG. 2 is an exploded perspective view schematically showing components of the battery module according to an embodiment of the present disclosure.

FIG. 1 is a perspective view schematically showing a battery module according to an embodiment of the present disclosure. FIG. 2 is an exploded perspective view schematically showing components of the battery module according to an embodiment of the present disclosure. Also, FIG. 3 is a plan view schematically showing a part of a bus bar, employed at the battery module according to an embodiment of the present disclosure.

Figure 3:
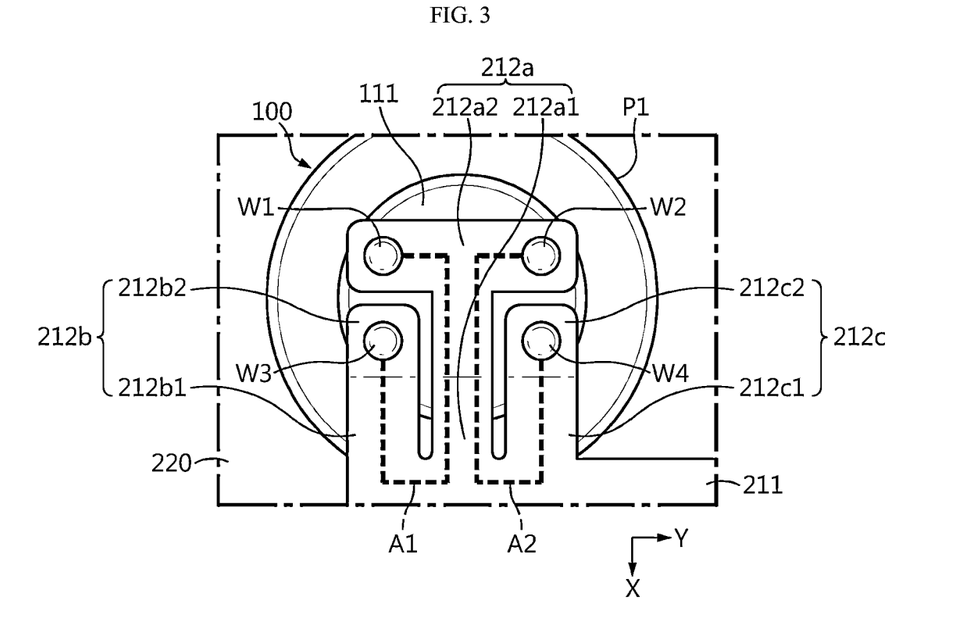
FIG. 3 is a plan view schematically showing a part of a bus bar, employed at the battery module according to an embodiment of the present disclosure.

Referring to FIGS. 1 to 3, a battery module 200 according to an embodiment of the present disclosure may include a plurality of secondary batteries 100, a module housing 220, and a bus bar 210.

Here, the secondary battery 100 may include a cylindrical battery can 120, and an electrode assembly (not shown) accommodated in the battery can 120.

In addition, the battery can 120 includes a material with high electrical conductivity, and for example, the battery can 120 may include aluminum or copper material.

Moreover, the battery can 120 may be configured to stand long in an upper and lower direction. In addition, the battery can 120 may have a cylindrical shape extending in the upper and lower direction. Moreover, a positive electrode terminal 111 and a negative electrode terminal 112 may be respectively formed on upper and lower portions of the battery can 120, or a negative electrode terminal 112 and a positive electrode terminal 111 may be formed thereon. Specifically, a positive electrode terminal 111 may be formed on a flat circular upper surface at a top end of the battery can 120, and a negative electrode terminal 112 may be formed on a flat circular lower surface at a bottom end of the battery can 120.

Further, the secondary battery 100 may be arranged in a plurality of columns and rows in a horizontal direction. Here, the horizontal direction may refer to a direction parallel to the ground when the secondary battery 100 is placed on the ground, and may also refer to at least one direction on a plane perpendicular to the upper and lower direction. In addition, the horizontal direction may refer to X and Y directions of FIG. 1.

For example, as shown in FIG. 2, the battery module 200 may include a plurality of secondary batteries 100 arranged in five columns (X direction) and three rows (Y direction).

In addition, the electrode assembly (not shown) may be formed in a jelly-roll-type structure in a state where a separator is interposed between a positive electrode and a negative electrode. Moreover, a positive electrode tab may be attached to the positive electrode (not shown) and connected to the positive electrode terminal 111 at the top end of the battery can 120. A negative electrode tab (not shown) may be attached to the negative electrode (not shown) and connected to the negative electrode terminal 112 at the bottom end of the battery can 120.

Meanwhile, the module housing 220 may include an upper case 220a and a lower case 220b. The upper case 220a may be configured to cover an upper portion of the secondary battery 100. The lower case 220b may be configured to cover a lower portion of the secondary battery 100. A lower portion of the upper case 220a and an upper portion of the lower case 220b may be coupled to each other.

Each of the upper case 220a and the lower case 220b of the module housing 220 may have inner spaces 220s1, 220s2 in which the secondary battery 100 may be inserted and accommodated. Specifically, the inner spaces 220s1, 220s2 may have a plurality of hollow structures formed to surround an outer surface of the secondary battery 100. In this case, the module housing 220 may be made of an electrically insulating material. For example, the electrical insulating material may be a polymer plastic. More specifically, the electrical insulating material may be polyvinyl chloride.

Meanwhile, referring to FIGS. 1 to 3 again, the bus bar 210 may be configured to electrically connect the plurality of secondary batteries 100. For example, the bus bar 210 may be configured to electrically connect the plurality of secondary batteries 100 in series. Alternatively, the bus bar 210 may be configured to electrically connect the plurality of secondary batteries 100 in parallel. The bus bar 210 may have a metal plate with excellent electrical conductivity.

In addition, the bus bar 210 may include a body portion 211 positioned above or below the plurality of secondary batteries 100 and extending in a horizontal direction. Moreover, the body portion 211 may be disposed between the plurality of secondary batteries 100 arranged in two rows. The body portion 211 may have a rectangular plate shape with a predetermined thickness.

Moreover, the bus bar 210 may include a plurality of connection portions 212 respectively formed to extend from both X-directional sides of the body portion 211 in a horizontal direction to contact the electrode terminals 111 of the plurality of secondary batteries 100 from one side of the body portion 211. For example, as shown in FIG. 2, six connection portions 212 may be formed to extend in one direction (left direction) or the other direction (right direction) from both horizontal sides (X-directional sides in FIG. 1) of the body portion 211 to contact the upper surface of the electrode terminals 111 of the plurality of secondary batteries 100.

In addition, the present disclosure may include a bus bar 210a having an external input/output terminal formed at a front end thereof. A fastening hole may be formed at the front end of the bus bar 210a so that a terminal bolt is inserted therein.

Specifically, one connection portion 212 may include a first connection portion 212a, a second connection portion 212b, and a third connection portion 212c. The first connection portion 212a may protrusively extend from an end of the body portion 211 toward the electrode terminal 111. In this case, the first connection portion 212a may have a structure bent at least once toward the electrode terminal 111 of the secondary battery 100 (in a lower direction). For example, if the negative electrode terminal 112 is located at the periphery of the positive electrode terminal 111 of the secondary battery 100, the first connection portion 212a may be bent at least once to contact the positive electrode terminal 111 without contacting the negative electrode terminal 112.

The second connection portion 212b may protrusively extend from the end of the body portion 211 toward the electrode terminal 111. In this case, the second connection portion 212b may have a structure bent at least once toward the electrode terminal 111 of the secondary battery 100 (in a lower direction). For example, if the negative electrode terminal 112 is located at the periphery of the positive electrode terminal 111 of the secondary battery 100, the second connection portion 212b may be bent at least once from the body portion 211 to contact the positive electrode terminal 111 without contacting the negative electrode terminal 112. Accordingly, the second connection portion 212b may be located on one side (a left side in FIG. 3) of the first connection portion 212a. The second connection portion 212b may have a part spaced apart from the first connection portion 212a by a predetermined distance.

The third connection portion 212c may protrusively extend from the end of the body portion 211 toward the electrode terminal 111. In this case, the third connection portion 212c may have a structure bent at least once from the body portion 211 toward the electrode terminal 111 of the secondary battery 100. For example, if the negative electrode terminal 112 is located at the periphery of the positive electrode terminal 111 of the secondary battery 100, the third connection portion 212c may be bent at least once from the body portion 211 to contact the positive electrode terminal 111 without contacting the negative electrode terminal 112. The third connection portion 212c may be located on the other side (a right side in FIG. 3) of the first connection portion 212a. The second connection portion 212b may have a part spaced apart from the first connection portion 212a by a predetermined distance. In this case, the predetermined distance may be 2 mm or less.

In addition, each of the first connection portion 212a, the second connection portion 212b and the third connection portion 212c may have at least one welding point. For example, the first connection portion 212a may have two welding points W1, W2 spaced apart from each other. Each of the second connection portion 212b and the third connection portion 212c may have one welding point W3, W4.

Thus, according to this configuration of the present disclosure, the connection portion of the bus bar 210 includes a first connection portion 212a protrusively extending from the end of the body portion 211 toward the electrode terminal 111, a second connection portion 212b protrusively extending from the end of the body portion 211 toward the electrode terminal 111 and located at one side of the first connection portion 212a to have a part spaced apart from the first connection portion 212a by a predetermined distance, and a third connection portion 212c protrusively extending from the end of the body portion 211 toward the electrode terminal 111 and located at the other side of the first connection portion 212a to have a part spaced apart from the first connection portion 212a by a predetermined distance. Also, each of the first connection portion 212a, the second connection portion 212b and the third connection portion 212c has at least one welding point. Therefore, when resistance welding is performed between the electrode terminal 111 of the secondary battery and the connection portion of the bus bar 210, the resistance welding may be performed at two parts. Moreover, since the connection portion of the present disclosure is divided into three parts to simplify the shape, resistance welding may be easily performed even in a narrow space of the module housing where the electrode terminal 111 is exposed.

Further, the length of an electric connection path between the welding point of the first connection portion 212a and the welding point of the second connection portion 212b may be identical to the length of an electric connection path between the welding point of the first connection portion 212a and the welding point of the third connection portion 212c. For example, as shown in FIG. 3, the electric connection length A1 between the welding point W1 of the first connection portion 212a and the welding point W3 of the second connection portion 212b may be similar or identical to the electric connection length A2 between the welding point W2 of the first connection portion 212a and the welding point W4 of the third connection portion 212c.

Therefore, according to this configuration of the present disclosure, since the length of the electric connection path A1 between the welding point of the first connection portion 212a and the welding point of the second connection portion 212b is identical to the length of the electric connection path A2 between the welding point of the first connection portion 212a and the welding point of the third connection portion 212c, when resistance welding performed at the welding point, two or more welding parts may be welded using the same amount of current, so it is not needed to change the amount of current for welding every welding part. Therefore, the welding process becomes easy, and the welding quality of two or more welding sites may be uniform. Ultimately, the present disclosure may improve the efficiency of resistance welding and the bonding reliability.

Therefore, according to an embodiment of the present disclosure, since each of the first connection portion 212a, the second connection portion 212b and the third connection portion 212c is bent at least once to contact the positive electrode terminal 111 without contacting the negative electrode terminal 112, it is possible to prevent a short circuit from occurring by contacting both the positive electrode terminal 111 and the negative electrode terminal 112 of the bus bar.

Referring to FIG. 3 again along with FIG. 1, the module housing 220 may have an opening P1 perforated at each of a top end and a bottom end thereof to communicate with the inner space 220s1 so that the electrode terminal 111 may be exposed to the outside.

Specifically, the first connection portion 212a may include a first extending part 212a1 and a first junction part 212a2. The first extending part 212a1 may be a part extending from the end of the body portion 211 into the opening P1. The first extending part 212a1 may be bent toward the electrode terminal 111. The first junction part 212a2 may be a part extending from the first extending part 212a1 to face the electrode terminal 111. The first junction part 212a2 may have at least two welding points W1, W2. For example, as shown in FIG. 3, the first junction part 212a2 may have two welding points W1, W2.

In addition, the second connection portion 212b may include a second extending part 212b1 and a second junction part 212b2. The second extending part 212b1 may be a part extending from the end of the body portion 211 into the opening P1. The second extending part 212b1 may be bent toward the electrode terminal 111. The second junction part 212b2 may be a part extending from the second extending part 212b1 to face the electrode terminal 111. The second junction part 212b2 may have at least one welding point W3. For example, as shown in FIG. 3, the second junction part 212b2 may have one welding point W3.

Moreover, the third connection portion 212c may include a third extending part 212c1 and a third junction part 212c2. The third extending part 212c1 may be a part extending from the end of the body portion 211 into the opening P1. The third extending part 212c1 may be bent toward the electrode terminal 111. The third junction part 212c2 may be a part extending from the third extending part 212c1 to face the electrode terminal 111. The third junction part 212c2 may have at least one welding point W4. For example, as shown in FIG. 3, the third junction part 212c2 may have one welding point W4.

In addition, the first junction part 212a2 of the first connection portion 212a may extend horizontally in both directions (Y direction in FIG. 2) from the first extending part 212a1. The welding points W1, W2 may be formed at both ends of the first junction part 212a2, respectively. At this time, the welding point W3 of the second junction part 212b2 may be located facing the welding point W1 formed at any one of both ends (a left end in FIG. 3) of the first junction part 212a2. In addition, the welding point W4 of the third junction part 212c2 may be located to face the welding point W2 formed at the other of both ends (a right end) of the first junction part 212a2.

Therefore, according to this configuration of the present disclosure, the first junction part 212a2 of the first connection portion 212a extends horizontally in both directions from the first extending part 212a1, the welding points W1, W2 are formed at both extending ends of the first junction part 212a2, the welding point W3 of the second junction part 212b2 is located to face the welding point W1 formed at any one of both ends of the first junction part 212a2, and the welding point W4 of the junction part 212c2 is located to face the welding point W2 formed at the other of both ends of the first junction part 212a2. Therefore, if resistance welding is performed between the electrode terminal 111 of the secondary battery 100 and the connection portion 212 of the bus bar 210, the resistance welding may be performed at two parts. Moreover, since each of the first to third connection portions 212a to 212c of the present disclosure has a bent extending portion, the shape of the connection portion may be simplified. Accordingly, resistance welding may be easily performed even in a narrow space of the module housing 220 where the electrode terminal 111 is exposed.

Figure 4:
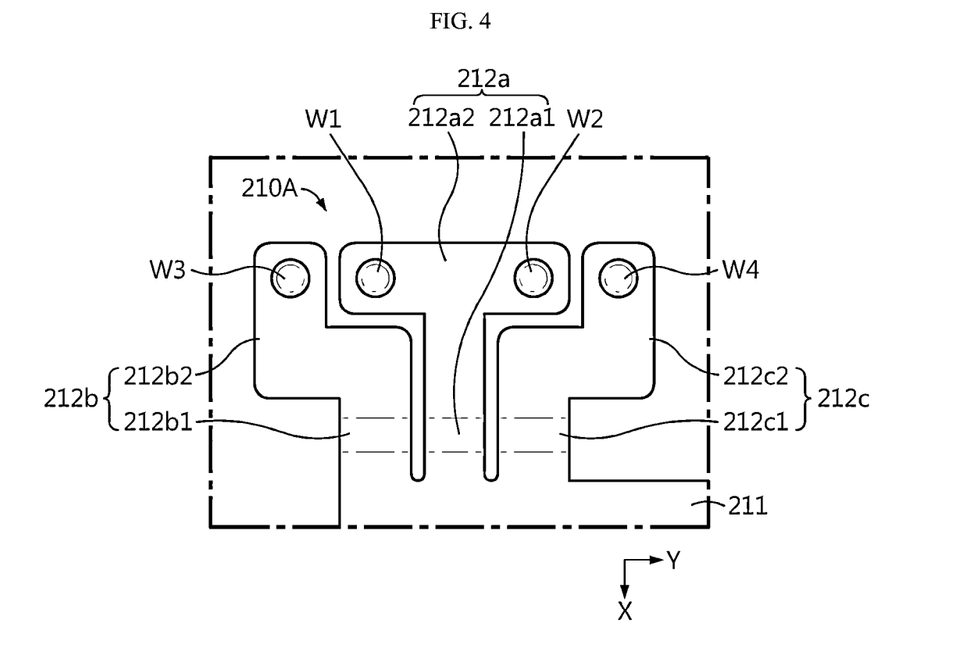
FIG. 4 is a plan view schematically showing a part of a bus bar, employed at a battery module according to another embodiment (a second embodiment) of the present disclosure.

FIG. 4 is a plan view schematically showing a part of a bus bar, employed at a battery module according to another embodiment (a second embodiment) of the present disclosure.

Referring to FIG. 4, in a bus bar 210A of FIG. 4, the second junction part 212b2 of second connection portion 212b may further have a structure that is bent and extends along an outer circumference of any one of both ends (a left end in FIG. 4) of the first junction part 212a2 of the first connection portion 212a in the front and rear direction (Y-axis direction), unlike the bus bar 210 of FIG. 3. In addition, the third junction part 212c2 of the third connection portion 212c may have a structure bent and extending along an outer circumference of the other of both ends (a right end) of the first junction part 212a2 of the first connection portion 212a.

Therefore, according to this configuration of the present disclosure, the second junction part 212b2 of the second connection portion 212b is bent and extends along the outer circumference of any one of both ends of the first junction part 212a2 of the first connection portion 212a, and the third junction part 212c2 of the third connection portion 212c is bent and extends along the outer circumference of the other of both ends of the first junction part 212a2 of the first connection portion 212a. Therefore, the length from each of the welding points W1, W2 of the first connection portion 212a to the welding point W3, W4 of each of the second connection portion 212b and the third connection portion 212c may be increased more, and a compact shape may be provided. Accordingly, the current resistance may be set to be greater, so the resistance welding may be performed at a higher temperature, thereby allowing fast and reliable welding.

Figure 5:
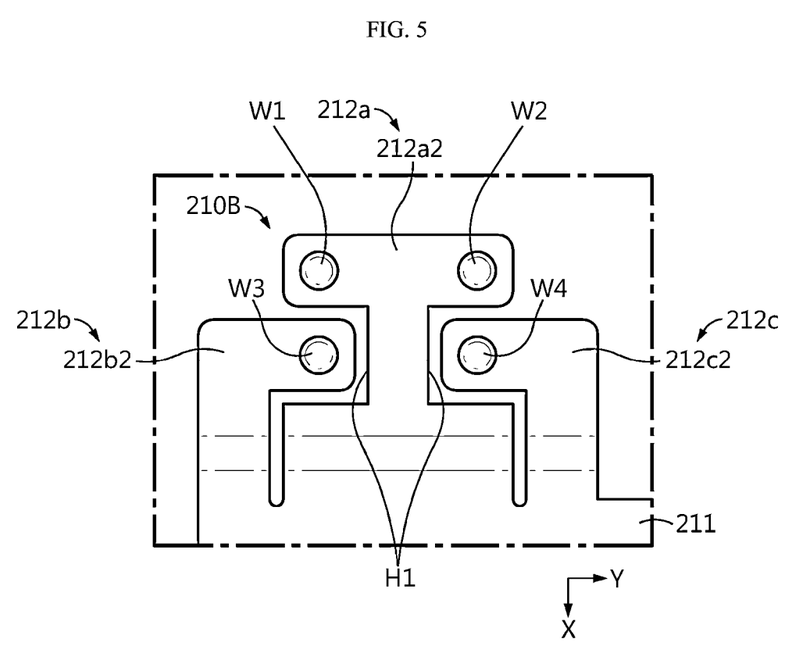
FIG. 5 is a plan view schematically showing a part of a bus bar, employed at a battery module according to another embodiment (a third embodiment) of the present disclosure.

FIG. 5 is a plan view schematically showing a part of a bus bar, employed at a battery module according to another embodiment (a third embodiment) of the present disclosure.

Referring to FIG. 5, in a bus bar 210B of FIG. 5, at least two grooves H1 recessed toward an inside of the body portion may be provided to the first junction part 212a2, unlike the bus bar 210 of FIG. 3. The end of each of the second junction part 212b2 and the third junction part 212c2 may have a structure bent in a horizontal direction to be inserted into each of the at least two grooves H1. For example, as shown in FIG. 5, the groove H1 may be provided at each of both side ends of the first connection portion 212a of the bus bar 210B. The end of the second junction part 212b2 may be inserted into the groove H1 formed at a left end of the first junction part 212a2 on the drawing, and the end of the third junction part 212c2 may be inserted into the groove H1 formed at a right end of the first junction part 212a2 on the drawing. The end of each of the second junction part 212b2 and the third junction part 212c2 may be bent toward the first junction part 212a2.

Therefore, according to this configuration of the present disclosure, at least two grooves H1 recessed toward the inside of the body portion are provided to the first junction part 212a2, and each of the second junction part 212b2 and the third junction part 212c2 is bent in a horizontal direction to be inserted into each of the at least two grooves H1. Therefore, the shape of the connection portion 212 may be simplified, and the length from the welding points W1, W2 of the first connection portion 212a to the welding point W3, W4 of each of the second connection portion 212b and the third connection portion 212c may be increased more. Accordingly, the current resistance may be set to be greater, so the resistance welding may be performed at a higher temperature, thereby allowing fast and reliable welding.

Figure 6:
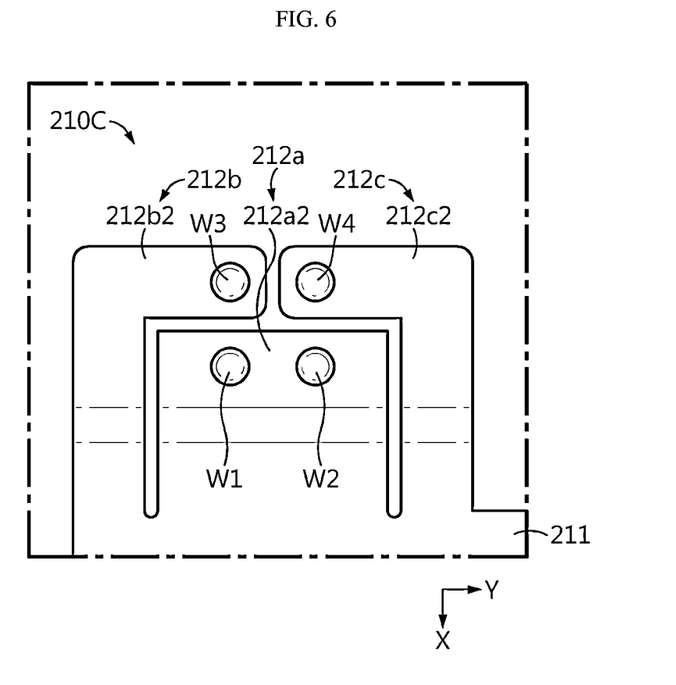
FIG. 6 is a plan view schematically showing a part of a bus bar, employed at a battery module according to another embodiment (a fourth embodiment) of the present disclosure.

FIG. 6 is a plan view schematically showing a part of a bus bar, employed at a battery module according to another embodiment (a fourth embodiment) of the present disclosure.

Referring to FIG. 6, in a bus bar 210C of FIG. 6, the first junction part 212a2 of the first connection portion 212a may have a shape extending in one direction from the first extending part 212a1, unlike the bus bar 210 of FIG. 3. The first junction part 212a2 may have a rectangular shape on a plane.

In addition, each of the second junction part 212b2 of the second connection portion 212b and the third junction part 212c2 of the third connection portion 212c may be bent in a horizontal direction to surround the outer circumference of the first junction part 212a2. For example, as shown in FIG. 6, the end of the second junction part 212b2 may have a shape bent horizontally to the right to surround a left outer circumference of the first junction part 212a2 on the drawing. The end of the third junction part 212c2 may have a shape bent horizontally to the left to surround a right outer circumference of the first junction part 212a2 on the drawing.

Therefore, according to this configuration of the present disclosure, the first junction part 212a2 extends in one direction from the first extending part 212a1, and each of the second junction part 212b2 and the third junction part 212c2 is bent in a horizontal direction to surround the outer circumference of the first junction part 212a2. Therefore, the shape of the connection portions may be simplified, and the length from the welding points W1, W2 of the first connection portion 212a to the welding point W3, W4 of each of the second connection portion 212b and the third connection portion 212c may be increased more. Accordingly, the current resistance may be set to be greater, so the resistance welding may be performed at a higher temperature, thereby allowing fast and reliable welding.

Figure 7:
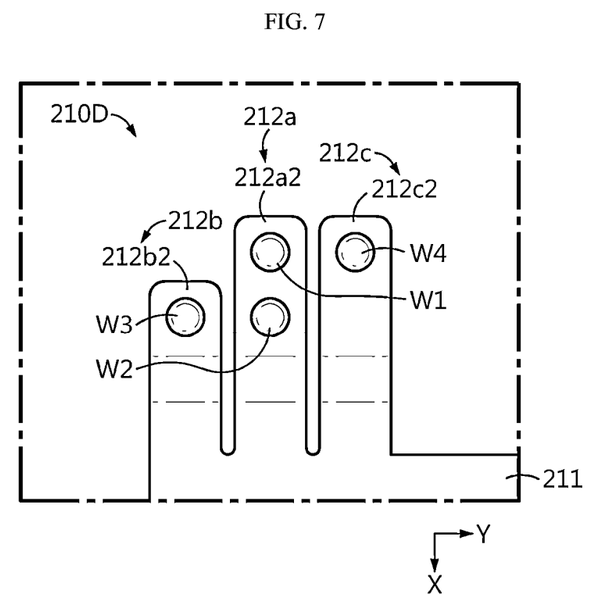
FIG. 7 is a plan view schematically showing a part of a bus bar, employed at a battery module according to another embodiment (a fifth embodiment) of the present disclosure.

FIG. 7 is a plan view schematically showing a part of a bus bar, employed at a battery module according to another embodiment (a fifth embodiment) of the present disclosure.

Referring to FIG. 7, in a bus bar 210D of the fifth embodiment, at least one of the second junction part 212b2 of the second connection portion 212b and the third junction part 212c2 of the third connection portion 212c may extend longer in one direction (an outer direction) than the first junction part 212a2 from the body portion 211. Alternatively, in the bus bar 210D of the fifth embodiment, at least one of the second junction part 212b2 of the second connection portion 212b and the third junction part 212c2 of the third connection portion 212c may extend shorter in one direction (an inner direction) than the first junction part 212a2 from the body portion 211. For example, as shown in FIG. 7, the second junction part 212b2 of the second connection portion 212b may be formed shorter in the inner direction than the first junction part 212a2 of the first connection portion 212a on a plane.

In addition, at least two welding points W1, W2 formed in the first junction part 212a2 of the first connection portion 212a may be provided in parallel to the extending direction of the first connection portion 212a. For example, as shown in FIG. 7, the welding point W2 of the first junction part 212a2 may be formed at a position parallel to the welding point W3 of the second junction part 212b2, and the other welding point W1 of the first junction part 212a2 may be formed at a position parallel to the welding point W4 of the third junction part 212c2.

Moreover, the welding points may be configured such that the length of the electric connection path between the first connection portion 212a and the second connection portion 212b is identical to the length of the electric connection path between the first connection portion 212a and the third connection portion 212c. For example, as shown in FIG. 7, the electric connection length between the welding point W1 of the first connection portion 212a and the welding point W3 of the second connection portion 212b may be identical to the electric connection length between the welding point W2 of the first connection portion 212a and the welding points W4 of the third connection portion 212c.

Figure 8:
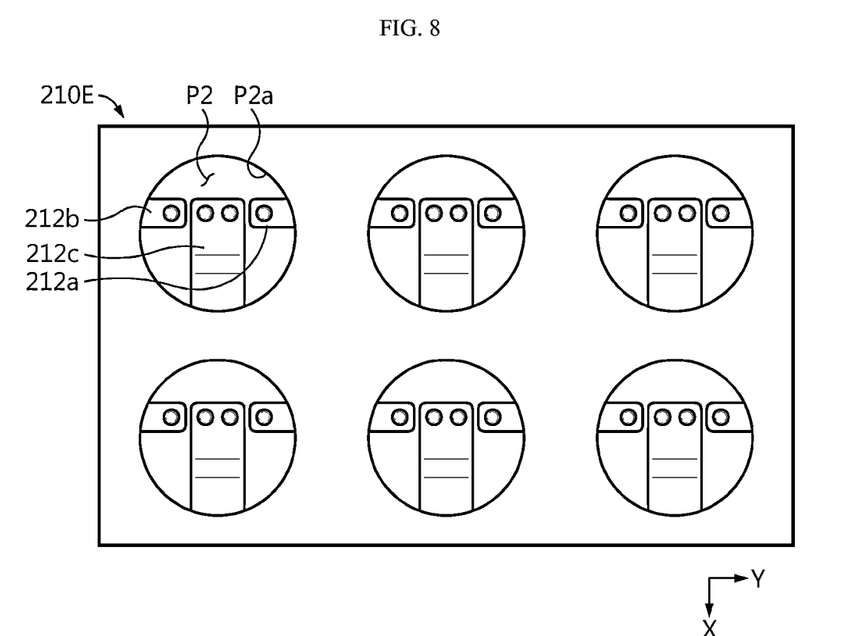
FIG. 8 is a plan view schematically showing a part of a bus bar, employed at a battery module according to another embodiment (a sixth embodiment) of the present disclosure.

FIG. 8 is a plan view schematically showing a part of a bus bar, employed at a battery module according to another embodiment (a sixth embodiment) of the present disclosure.

Referring to FIG. 8, a bus bar 210E of the sixth embodiment may have at least one connection hole P2 perforated in the body portion 211, unlike the bus bar 210 of FIG. 2. For example, as shown in FIG. 8, six connection holes P2 may be provided in the body portion 211 of the bus bar 210E.

In addition, at least two of the first connection portion 212a, the second connection portion 212b and the third connection portion 212c may protrusively extend in different directions from an inner rim P2a of the connection hole P2. For example, as shown in FIG. 8, six connection holes P2 may be provided in the body portion 211 of the bus bar 210E. The first connection portion 212a, the second connection portion 212b and the third connection portion 212c may be provided in a form extending from the rim P2a of the connection hole P2 toward a center of the connection hole P2. The second connection portion 212b may extend in a direction perpendicular to the extending direction of the first connection portion 212a, and the third connection portion 212c may also extend in a direction perpendicular to the extending direction of the first connection portion 212a.

Meanwhile, a battery pack (not shown) according to the present disclosure may include a plurality of battery modules 200, and may further include various devices for controlling charging and discharging of the battery modules 200, such as a BMS (Battery Management System), a current sensor, a fuse, or the like, in addition to these battery modules 200.

In addition, the battery pack according to the present disclosure may be applied to an electronic device such as a drone or a computer, or may be applied to a vehicle such as an electric vehicle or a hybrid electric vehicle. That is, the vehicle according to the present disclosure may include at least one battery pack.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery module | |
| 100: secondary battery | |
| 220: module housing | 210: bus bar |
| 211: body portion | |
| 212, 212a, 212b, 212c: connection portion, first connection portion, second connection portion, third connection portion | |
| W1, W2, W3, W4: welding point | |
| P1: opening | P2: connection hole |
| 212a1, 212b1, 212c1: first extending part, second extending part, third extending part | |
| 212a2, 212b2, 212c2: first junction part, second junction part, third junction part | |
| H1: groove | P2a: rim |

What is claimed is:

1. A battery module, comprising:
a plurality of secondary batteries, each having at least two electrode terminals therein;
a module housing having an inner space configured to accommodate the plurality of secondary batteries; and
a bus bar including a body portion having a metal plate configured to electrically connect the plurality of secondary batteries to each other and a connection portion extending from the body portion to contact the electrode terminal,
wherein the connection portion includes:
a first connection portion configured to protrusively extend from the body portion toward the electrode terminal;
a second connection portion configured to protrusively extend from the body portion toward the electrode terminal and located at one side of the first connection portion, the second connection portion having a part spaced apart from the first connection portion by a predetermined distance; and a third connection portion configured to protrusively extend from the body portion toward the electrode terminal and located at the other side of the first connection portion, the third connection portion having a part spaced apart from the first connection portion by a predetermined distance, wherein each of the first connection portion, the second connection portion, and the third connection portion has at least one welding point, wherein the first connection portion includes a first extending part extending from the body portion and bent toward the electrode terminal, and a first junction part extending from the first extending part to face the electrode terminal and having at least two welding points, wherein the second connection portion includes a second extending part extending from the body portion and bent toward the electrode terminal, and a second junction part extending from the second extending part to face the electrode terminal and having at least one welding point, wherein the third connection portion includes a third extending part extending from the body portion and bent toward the electrode terminal, and a third junction part extending from the third extending part to face the electrode terminal and having at least one welding point, wherein the first junction part of the first connection portion horizontally extends in both directions from the first extending part and has welding points respectively formed at both extending ends of the first junction part, wherein the welding point of the second junction part is located to face the welding point formed at any one of both ends of the first junction part, and wherein the welding point of the third junction part is located to face the welding point formed at the other of both ends of the first junction part.

2. The battery module according to claim 1, wherein a length of an electric connection path between the welding point of the first connection portion and the welding point of the second connection portion is substantially the same as a length of an electric connection path between the welding point of the first connection portion and the welding point of the third connection portion.

3. The battery module according to claim 1, wherein the module housing has an opening perforated to expose the electrode terminal to the outside, and wherein each of the first extending part, the second extending part, and the third extending part extend to the opening.

4. The battery module according to claim 1, wherein the second junction part of the second connection portion is bent and extends along an outer circumference of any one of both ends of the first junction part of the first connection portion, and wherein the third junction part of the third connection portion is bent and extends along an outer circumference of the other of both ends of the first junction part of the first connection portion.

5. The battery module according to claim 1, wherein the first junction part has at least two grooves recessed toward an inside of the body portion, and wherein an end of each of the second junction part and the third junction part is bent in a horizontal direction to be inserted into each of the at least two grooves.

6. The battery module according to claim 1, wherein the first junction part extends in one direction from the first extending part, and wherein the second junction part and the third junction part are respectively bent in a horizontal direction to surround an outer circumference of the first junction part.

7. The battery module according to claim 1, wherein at least one of the second junction part and the third junction part extends longer or shorter than the first junction part from the body portion in one direction.

8. The battery module according to claim 1, wherein the bus bar has at least one connection hole in the body portion, and wherein at least two of the first connection portion, the second connection portion and the third connection portion protrusively extend in different directions from an inner rim of the connection hole.

9. A battery pack, comprising the battery module according to claim 1.

10. A vehicle, comprising the battery pack according to claim 9.

11. A battery module, comprising:

a plurality of secondary batteries, each having at least two electrode terminals therein;

a module housing having an inner space configured to accommodate the plurality of secondary batteries; and a bus bar including a body portion having a metal plate configured to electrically connect the plurality of secondary batteries to each other and a connection portion extending from the body portion to contact the electrode terminal, wherein the connection portion includes:

a first connection portion configured to protrusively extend from the body portion toward the electrode terminal;

a second connection portion configured to protrusively extend from the body portion toward the electrode terminal and located at one side of the first connection portion, the second connection portion having a part spaced apart from the first connection portion by a predetermined distance; and a third connection portion configured to protrusively extend from the body portion toward the electrode terminal and located at the other side of the first connection portion, the third connection portion having a part spaced apart from the first connection portion by a predetermined distance, wherein each of the first connection portion, the second connection portion, and the third connection portion has at least one welding point, wherein the first connection portion includes a first extending part extending from the body portion and bent toward the electrode terminal, and a first junction part extending from the first extending part to face the electrode terminal and having at least two welding points, wherein the second connection portion includes a second extending part extending from the body portion and bent toward the electrode terminal, and a second junction part extending from the second extending part to face the electrode terminal and having at least one welding point, wherein the third connection portion includes a third extending part extending from the body portion and bent toward the electrode terminal, and a third junction part extending from the third extending part to face the electrode terminal and having at least one welding point, wherein the first junction part has at least two grooves recessed toward an inside of the body portion, and wherein an end of each of the second junction part and the third junction part is bent in a horizontal direction to be inserted into each of the at least two grooves.

12. A battery module, comprising:

a plurality of secondary batteries, each having at least two electrode terminals therein;

a module housing having an inner space configured to accommodate the plurality of secondary batteries; and a bus bar including a body portion having a metal plate configured to electrically connect the plurality of secondary batteries to each other and a connection portion extending from the body portion to contact the electrode terminal, wherein the connection portion includes:
- a first connection portion configured to protrusively extend from the body portion toward the electrode terminal;
- a second connection portion configured to protrusively extend from the body portion toward the electrode terminal and located at one side of the first connection portion, the second connection portion having a part spaced apart from the first connection portion by a predetermined distance; and
- a third connection portion configured to protrusively extend from the body portion toward the electrode terminal and located at the other side of the first connection portion, the third connection portion having a part spaced apart from the first connection portion by a predetermined distance, wherein each of the first connection portion, the second connection portion, and the third connection portion has at least one welding point, wherein the first connection portion includes a first extending part extending from the body portion and bent toward the electrode terminal, and a first junction part extending from the first extending part to face the electrode terminal and having at least two welding points, wherein the second connection portion includes a second extending part extending from the body portion and bent toward the electrode terminal, and a second junction part extending from the second extending part to face the electrode terminal and having at least one welding point, wherein the third connection portion includes a third extending part extending from the body portion and bent toward the electrode terminal, and a third junction part extending from the third extending part to face the electrode terminal and having at least one welding point, wherein the first junction part extends in one direction from the first extending part, and wherein the second junction part and the third junction part are respectively bent in a horizontal direction to surround an outer circumference of the first junction part.

* * * * *